United States Patent
Mayrhofer et al.

(10) Patent No.: US 6,578,908 B2
(45) Date of Patent: Jun. 17, 2003

(54) SUPPORTING STRUCTURE OF UNITIZED BODY

(75) Inventors: Robert Mayrhofer, Boeblingen (DE); Ralf Mehrholz, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/013,122

(22) Filed: Dec. 7, 2001

(65) Prior Publication Data

US 2002/0079722 A1 Jun. 27, 2002

(30) Foreign Application Priority Data

Dec. 12, 2000 (DE) .......................... 100 61 848

(51) Int. Cl.$^7$ .......................... B62D 27/02; B62D 25/08
(52) U.S. Cl. .......................... 296/204; 296/29; 296/205; 296/189
(58) Field of Search .......................... 296/203.01, 203.02, 296/203.04, 204, 205, 188, 189, 29; 280/784

(56) References Cited

U.S. PATENT DOCUMENTS

| 5,184,868 | A | * | 2/1993 | Nishiyama | 296/189 |
| 5,207,475 | A | * | 5/1993 | Hellstrom | 296/188 |
| 5,419,609 | A | * | 5/1995 | Kmiec et al. | 296/188 |
| 5,882,065 | A | * | 3/1999 | Koiwa et al. | 296/203.02 |
| 6,010,155 | A | * | 1/2000 | Rinehart | 296/29 |
| 6,099,194 | A | * | 8/2000 | Durand | 296/29 |

* cited by examiner

Primary Examiner—D. Glenn Dayoan
Assistant Examiner—Gregory Blankenship
(74) Attorney, Agent, or Firm—Kenyon & Kenyon

(57) ABSTRACT

A supporting structure of a unitized body includes at least one hollow support that is made up of two longitudinal segments, the longitudinal segments being joined to each other in the area of a joining plane extending transversely with respect to the longitudinal axis of the hollow support, the end areas of the longitudinal segments being joined to each other so as to overlap. The end areas of the longitudinal segments, which overlap each other, extend diagonally with respect to the central longitudinal axis of the hollow support in the joining area.

9 Claims, 3 Drawing Sheets

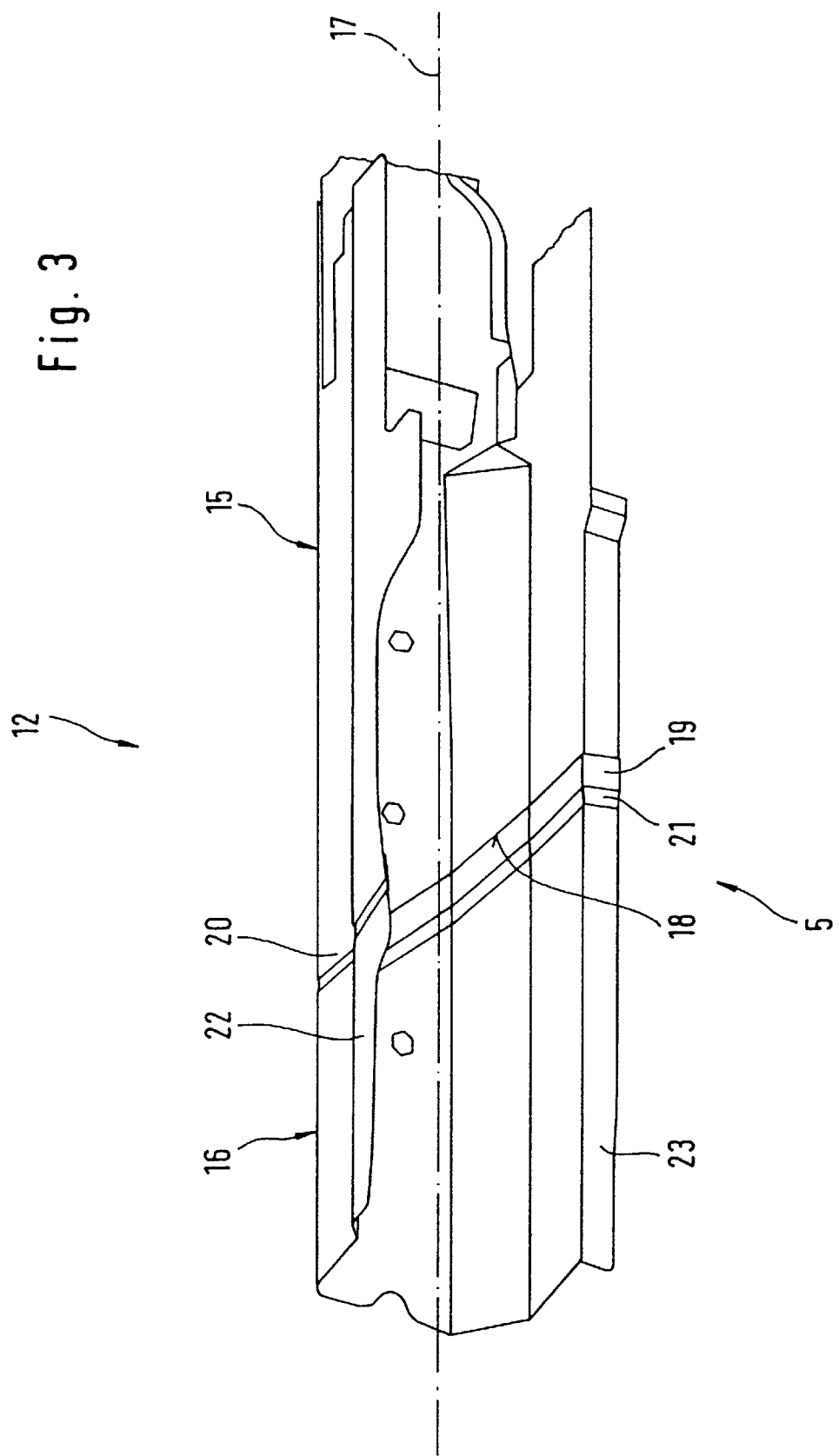

SUPPORTING STRUCTURE OF UNITIZED BODY

FIELD OF THE INVENTION

The present invention relates to a supporting structure of a unitized body having at least one hollow support made up of two longitudinal segments in accordance with the preamble.

BACKGROUND INFORMATION

In vehicle mass production, for example in the Mercedes C Class, it is customary to use hollow supports in the supporting structure that are assembled so as to be transverse with respect to the central longitudinal axis, in order to realize, for example, different vehicle lengths using the same frame platform. For this purpose, end areas of two longitudinal segments of a hollow support are inserted one in the other and are joined to each other, for example, by spot welding, so that the end areas of the longitudinal segments are joined in an overlapping manner.

The interface produced by the overlapping end areas results in a change in rigidity in the longitudinal extension of the hollow support. In particular, in response to collision stresses in the direction of the central longitudinal axis, the joining area is less able to absorb energy as a result of the ensuing increase in rigidity.

It is an object of the present invention is to provide a supporting structure of a unitized body, in which the connective intensity between two longitudinal segments of a hollow support is improved.

SUMMARY

The above and other beneficial objects of the present invention are achieved by providing a supporting structure as described herein.

Due to the joining plane running diagonal with respect to the central longitudinal axis of the hollow support, it is achieved that the joining area extends over a larger longitudinal segment of the hollow support. The change in rigidity, which arises as a result of the overlapping and joining of the end areas, accordingly is distributed over the hollow support longitudinal segment, in which the joining plane extends. The reduced rigidity increase as a result of the greater length of the joint between the two longitudinal segments also brings about an improved behavior of the hollow support in response to vibration stresses, because each individual connecting point is correspondingly less stressed.

In particular, in the case of longitudinal supports the joining area of which is situated in a crumple zone of the body, it is possible that, despite the doubling of the metal thickness in the joining area, the hollow support will fold up in a stress direction acting parallel to the central longitudinal axis. The longitudinal segments may be dimensioned accordingly.

As a function of the arrangement of the hollow support, the joining plane may be tilted in the joining area by approximately 15° to 75° with respect to the central axis of the longitudinal support, in accordance with the rigidity intensity desired.

In one example embodiment of the present invention, the longitudinal support is arranged in the floor area of a vehicle rear, so as to be able to produce different vehicle lengths using the same frame platform. The joining plane is so aligned from the rear top to the front bottom that a controlled deformation is achieved in the event of a rear-end collision.

For the overlapping of the end areas of the longitudinal segments, one of the end areas is enlarged so as to be adapted to the cross-section of the other end area. Alternatively, it is also possible to taper one of the end areas so as to be adapted to the hollow cross-section of the other end area.

As a particularly cost-effective joining technique, spot welding may be used, it being possible to join the end areas of the longitudinal segments to each other using a double spot-welding row.

For creating a clamshell-type closed hollow-profile support, the longitudinal segments of the hollow support have a U-shaped cross-section that is open on one side. Longitudinal segments having an L-shaped cross-section may be joined to each other in the same manner.

After joining the diagonal end areas of the longitudinal segments, the open side is welded to the flanges of the hollow profile using a continuous closing plate.

In the case of hollow supports which are manufactured, for example, by a hydrodeformation process, the longitudinal segments have a hollow profile that is closed around the circumference, so that the end areas of the longitudinal segments may be inserted into one another and may be joined to each other, for example, by a circumferential welded seam.

BRIEF DESCRIPTION OF THE DRAWINGS

FIG. 3 illustrates a joined longitudinal support in a diagonal view from the side.

DETAILED DESCRIPTION

Figure 1:
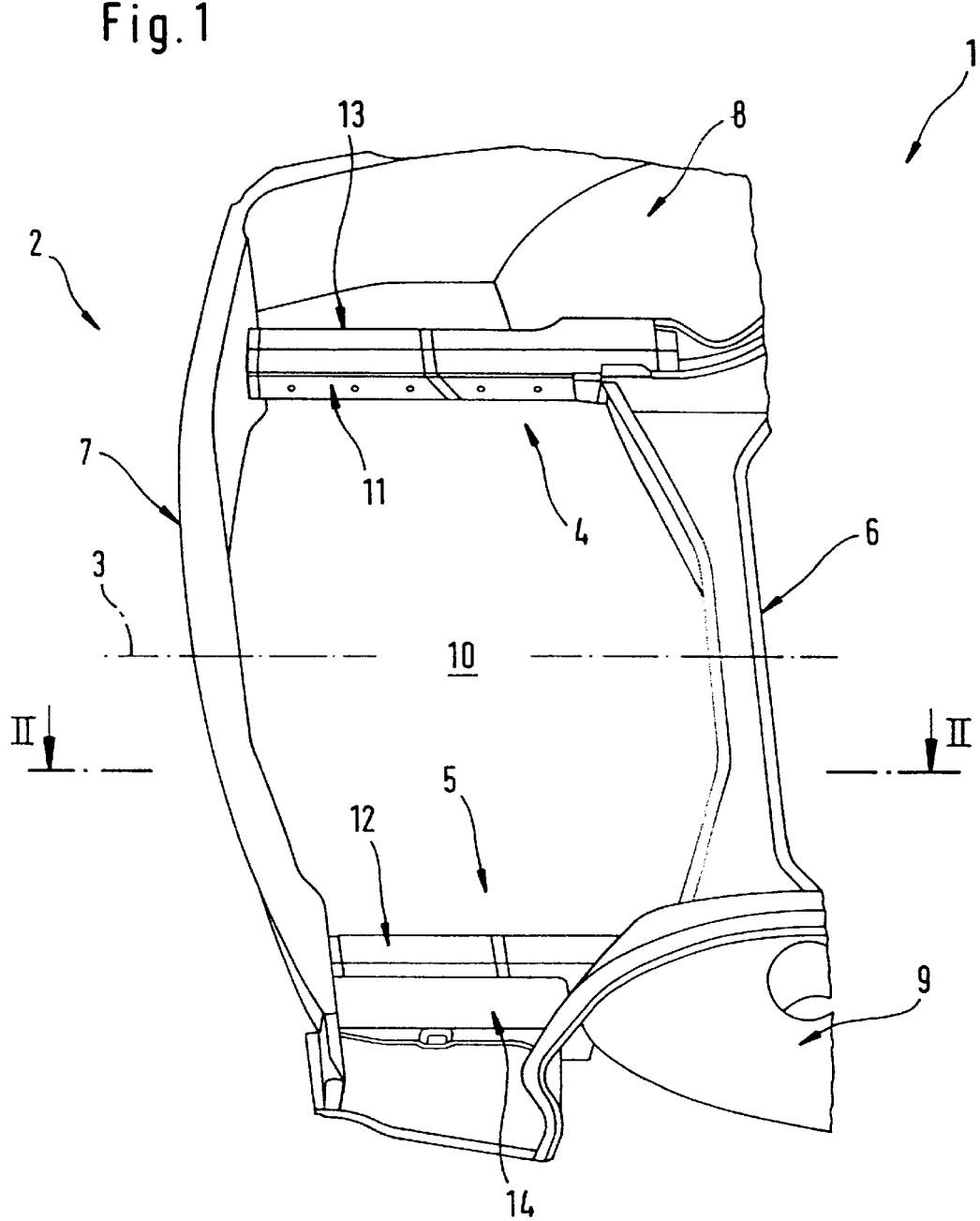
FIG. 1 is a schematic view of a vehicle rear in a direction diagonally from above.

In FIG. 1, supporting structure 1 of a vehicle rear 2 of a vehicle body is illustrated. Supporting structure 1 includes essentially two rear longitudinal supports 4 and 5 arranged in mirror-image symmetry with respect to central longitudinal plane 3, the longitudinal supports being joined to each other via a rear transverse support 6 and a bumper 7 and belonging to the crumple zone in the rear area of the vehicle.

On the side, rear longitudinal supports 4 and 5 are bordered by wheel housings 8 and 9 of the undepicted rear wheels and extend forward up to the C pillar. Below, longitudinal supports 4 and 5 are connected to a floor panel 10.

Each of longitudinal supports 4 and 5, considered lengthwise, is made up of a hollow support 11 and 12 and a closing plate 13 and 14, so that a closed hollow-profile cross-section is formed.

Figure 2:
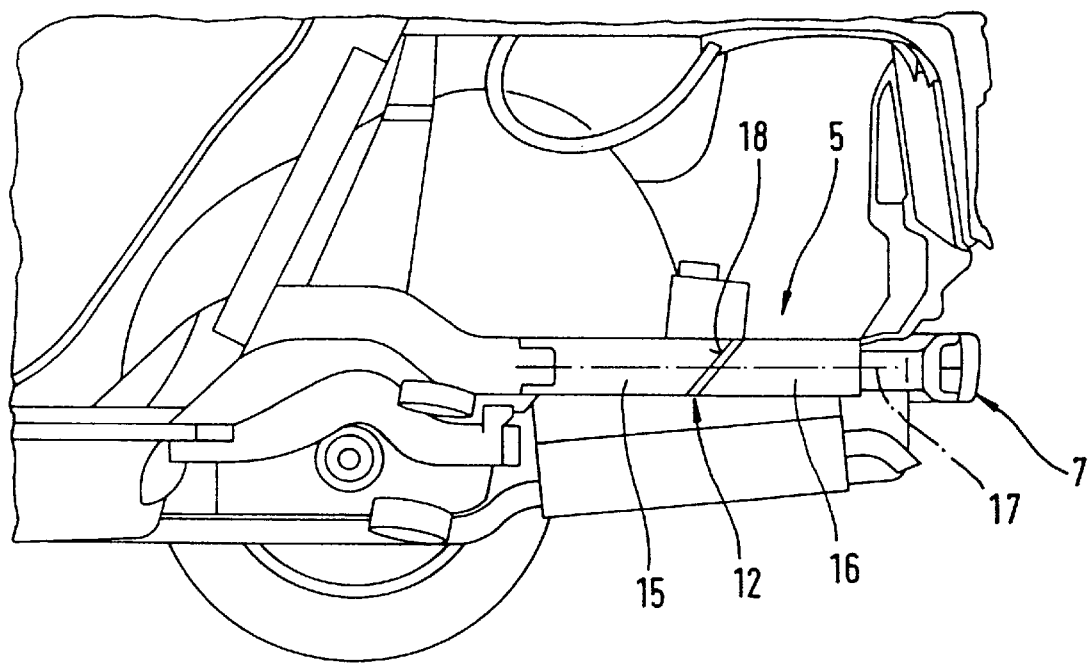
FIG. 2 is a cross-sectional view taken along the line II—II illustrated in FIG. 1.

As illustrated in the cross-sectional view of FIG. 2, each hollow support 12, configured as an inner shell, of rear longitudinal support 5 is made up of two longitudinal segments 15 and 16 along a joining plane 18 extending diagonally with respect to central longitudinal axis 17 of hollow support 12. Hollow support 11 of longitudinal support 4 is configured in a similar manner.

As illustrated in FIG. 3, the configuration and the mode of functioning of hollow support 12 is discussed in greater detail below. Due to the mirror-image symmetry, configurations may be transferred to hollow support 11 of rear longitudinal support 4.

For joining plane 18, which is tilted approximately at a 45° angle, end areas 19 and 20, extending diagonally with respect to central longitudinal axis 17, are provided on longitudinal segments 15 and 16, which have a U-shaped cross-section that is open on one side. In order to be able to join longitudinal segments 15 and 16 to each other by spot welding, the tapering cross-section of end area 19 is adjusted to the hollow cross-section of end area 20, so that end area 20 may be slid onto end area 19 up to a shoulder 21. In this manner, it is possible to perform a tolerance adjustment in the longitudinal direction of hollow support 12 in a simple manner.

After longitudinal segments 15 and 16 are joined, closing plate 14 is joined by spot welding to flanges 22 and 23 that are formed on the longitudinal sides of hollow support 12, so that a closed hollow cross-section of longitudinal support 5 results. Longitudinal support 5 may be furnished in a familiar manner with bending points, so as to absorb energy in the event of a rear-end collision.

Using joining plane 18 extending diagonally with respect to central longitudinal axis 17 of hollow support 12, the connecting length between longitudinal segments 15 and 16 is expanded, and with it the connective intensity. In response to stress forces acting in the direction of central longitudinal axis 17, for example, in response to a rear-end collision, the force is spread out in the slanted joining plane, so that a uniform or more uniform distribution of the load is achieved at the interface, than in a joining plane extending perpendicularly to central longitudinal axis 17. In addition, because the connective length is extended, a buckling of the longitudinal support is delayed in the area of the joining plane, or it is stabilized as a result of the angle of the joining plane from rear top to the front bottom.

What is claimed is:

1. A supporting structure of a unitized body, comprising:

at least one hollow support having a central longitudinal axis formed of two coaxial longitudinal segments, the longitudinal segments joined to each other in an area of a joining plane extending transversely to the longitudinal axis of the hollow support, end areas of the longitudinal segments joined to each other so as to overlap;

wherein the overlapping end areas of the longitudinal segments extend diagonally with respect to the longitudinal axis of the hollow support in the joining area.

2. The supporting structure according to claim 1, wherein the hollow support includes a partial shell of a longitudinal support formed of a plurality of partial shells, the joining plane arranged in a longitudinal area corresponding to a crumple zone of the body.

3. The supporting structure according to claim 2, wherein the joining plane extends at an angle of between 15° and 75° with respect to the central longitudinal axis of the hollow support in the area of the joining plane.

4. The supporting structure according to claim 3, wherein the longitudinal support is arranged in a floor area of a motor vehicle rear end, the joining plane extending at an angle from a rear top to a front bottom.

5. The supporting structure according to claim 1, wherein a first one of the end areas is tapered and adapted to a hollow cross-section of a second one of the end areas.

6. The supporting structure according to claim 5, wherein the end areas of the longitudinal segments are joined to each other by a spot weld.

7. The supporting structure according to claim 1, wherein the longitudinal segments of the hollow support have a U-shaped cross-section open on one side.

8. The supporting structure according to claim 7, wherein the open side of the longitudinal segments joined to the hollow support are closed by a closing plate.

9. The supporting structure according to claim 1, wherein the longitudinal segments of the hollow support have a hollow profile cross-section closed around a circumference.

* * * * *